US007673014B2

(12) United States Patent
Fukinawa

(10) Patent No.: US 7,673,014 B2
(45) Date of Patent: Mar. 2, 2010

(54) PRODUCT INFORMATION FOR SUPPORTING OPERATIONS OF AN ELECTRONIC PRODUCT VIA THE WEB

(75) Inventor: Osamu Fukinawa, Niigata (JP)

(73) Assignee: Fuji Xerox Co., Ltd., Tokyo (JP)

( * ) Notice: Subject to any disclaimer, the term of this patent is extended or adjusted under 35 U.S.C. 154(b) by 701 days.

(21) Appl. No.: 11/179,730

(22) Filed: Jul. 13, 2005

(65) Prior Publication Data

US 2006/0184818 A1 Aug. 17, 2006

(30) Foreign Application Priority Data

Feb. 17, 2005 (JP) ............................ 2005-040963

(51) Int. Cl.
*G06F 15/16* (2006.01)

(52) U.S. Cl. ...................................... 709/217; 709/245

(58) Field of Classification Search ................. 709/202, 709/223, 232, 224, 235, 217

See application file for complete search history.

(56) References Cited

U.S. PATENT DOCUMENTS

| | | | | |
|---|---|---|---|---|
| 6,363,421 | B2 * | 3/2002 | Barker et al. | 709/223 |
| 6,491,217 | B2 * | 12/2002 | Catan | 235/375 |
| 6,676,014 | B2 * | 1/2004 | Catan | 235/375 |
| 2002/0046093 | A1 * | 4/2002 | Miller et al. | 705/14 |
| 2002/0143643 | A1 * | 10/2002 | Catan | 705/26 |
| 2003/0040835 | A1 * | 2/2003 | Ng et al. | 700/214 |
| 2003/0065755 | A1 * | 4/2003 | Gunji | 709/221 |
| 2003/0069848 | A1 * | 4/2003 | Larson et al. | 705/50 |
| 2004/0098610 | A1 * | 5/2004 | Hrastar | 713/200 |
| 2004/0218602 | A1 * | 11/2004 | Hrastar | 370/390 |

FOREIGN PATENT DOCUMENTS

| | | |
|---|---|---|
| JP | A 2001-312462 | 11/2001 |

* cited by examiner

*Primary Examiner*—Jeffrey Pwu
*Assistant Examiner*—Gerald Smarth
(74) *Attorney, Agent, or Firm*—Oliff & Berridge, PLC

(57) ABSTRACT

A product information providing apparatus for providing, via a network, product information for supporting operations of a product, comprises an electronic product information storage that stores electronic product information which contains a group of hierarchized files having a file format browsable through a Web browser; a table holder that holds an event table in which an event indicating a change in the state of the product is associated with address information of the product information corresponding to the event; an event detector that detects occurrence of the event; an address information acquisition unit that acquires address information corresponding to the event detected by the event detector by referring to the table holder; an accessing unit that accesses the corresponding electronic product information based on the address information acquired by the address information acquisition unit; and a display that displays the electronic product information accessed by the accessing unit.

7 Claims, 14 Drawing Sheets

FIG.4

| EVENT FROM PRINTER | CORRESPONDING URL |
| --- | --- |
| Error 1 | ./printer-manual/product1/error/error1.html |
| Error 2 | ./printer-manual/product1/error/error2.html |

FIG.7A

| EVENT FROM PRINTER | CORRESPONDING URL |
|---|---|
| Error 1 | ./printer-manual/product1/error/error1.html |
| Error 2 | ./printer-manual/product1/error/error2.html |
| Error 3 | NULL (NO CORRESPONDING URL) |

FIG.7B

| EVENT FROM PRINTER | CORRESPONDING URL |
|---|---|
| Error 1 | ./printer-manual/product1/error/renrakusaki.html |
| Error 2 | ./printer-manual/product1/error/error2.html |
| Error 3 | ./printer-manual/product1/error/error3.html |

FIG.12A

| | |
|---|---|
| Top Page Address | ./printer-manual/product1/index.html |
| Printer Error | ./printer-manual/product1/error/error1.html |
| | ./printer-manual/product1/error/error2.html |
| Tonner | ./printer-manual/product1/tonner/buy-it.html |
| | ./printer-manual/product1/tonner/change.html |

FIG.12B

| | |
|---|---|
| Top Page Address | ./printer-manual/product1/index.html |
| Printer Error | ./printer-manual/product1/index.html?error1 |
| | ./printer-manual/product1/index.html?error2 |
| Tonner | ./printer-manual/product1/index.html?buy-it |
| | ./printer-manual/product1/index.html?change |

PRODUCT INFORMATION FOR SUPPORTING OPERATIONS OF AN ELECTRONIC PRODUCT VIA THE WEB

BACKGROUND OF THE INVENTION

1. Field of the Invention

The present invention relates to a product information providing apparatus and a method for managing and providing electronic product information, and in particular to a product information providing apparatus and a method capable of providing product information most suitable for the use environment of the product.

2. Description of the Related Art

In recent years, breakthroughs in technology have developed and introduced into the market more complicated and sophisticated products one after another. Such product is accompanied with a balky operation manual which gives relatively detailed instructions to allow users to master the functions provided in the product, or with a basic manual which gives minimum required instructions to use the product. These manuals often include drawings and illustrations to help the user comprehend the contents.

However, even if a manual describes each of the functions in an easy-to-understand manner, it is becoming more difficult for a user to find necessary information from the manual having an enormous number of pages. It often happens that the user eventually finds out that he/she has been searching information not included in the manual. Moreover, it is often the case that the user does not always keep the manual handy, and has to look for the manual when necessary. Even if the manual is kept at a specific location, it will take some time for the user to fetch the manual, and it is impossible to acquire necessary information at once.

There have been proposed electronic manuals to solve these problems. However, they are not more than digitized equivalents of conventional manual books. It can hardly be said that such electronic manuals have solved the problems as described above. Moreover, the electronic manuals now available are not able to fully utilize the great variety of sophisticated functions.

According to a conventional technique disclosed in Japanese Patent Application Publication No. 2001-312462, an operating manual request code received from an image processing device is analyzed to retrieve requested operating method information from storage means, and the specific operating method information thus retrieved is downloaded to the request-originating image processing device. A user is thus not required to provide detailed information about current conditions of his/her image processing device to obtain a relevant part of the manual information corresponding thereto, and to be guided with appropriate operating instructions to operate the image processing device smoothly.

However, according to the conventional technique disclosed in the Japanese Patent Application Publication No. 2001-312462, the specific operating method information is downloaded based on an operating manual request code, but this technique is not more than digitizing the contents of a manual book and taking out a necessary part therefrom in a unit of a chapter or a section to display the same. The operation manual according to the conventional technique does not contain detailed information given by animation, for example. Further, since the manual is downloaded to a client terminal, the terminal requires an additional mechanism (resource) for this purpose.

SUMMARY OF THE INVENTION

The present invention has been made in view of the above circumstances and provide a product information providing apparatus and method capable of providing, by means of simple processing, product information most suitable for the use environment of the product.

According a first aspect of the present invention, a product information providing apparatus for providing, via a network, product information for supporting operations of a product, comprises an electronic product information storage that stores electronic product information which contains a group of hierarchized files having a file format browsable through a Web browser, the group of hierarchized files being associated with each other by a link structure formed with the use of address information; a table holder that holds an event table in which an event indicating a change in the state of the product is associated with address information of the product information corresponding to the event; an event detector that detects occurrence of the event; an address information acquisition unit that acquires address information corresponding to the event detected by the event detector by referring to the table holder; an accessing unit that accesses the corresponding electronic product information based on the address information acquired by the address information acquisition unit; and a display that displays the electronic product information accessed by the accessing unit.

According to another aspect of the invention, a product information providing apparatus for providing, via a network, product information for supporting operations of a product, comprises an electronic product information storage that stores electronic product information which contains a group of hierarchized files having a file format browsable through a Web browser, the group of hierarchized files being associated with each other by a link structure formed with the use of address information; a table holder that holds an event table in which an event indicating a change in the state of the product is associated with address information of the product information corresponding to the event; an event detector that detects occurrence of the event; an address information acquisition unit that acquires address information corresponding to the event detected by the event detector by referring to the table holder; an accessing unit that accesses the corresponding electronic product information based on the address information acquired by the address information acquisition unit; and a display that displays the electronic product information accessed by the accessing unit.

With the configuration of the present invention, an event which has occurred is detected, and address information corresponding to the detected event is obtained from an event table in which electronic product information corresponding to respective events is prestored in association with address information. The address information thus obtained is accessed to retrieve necessary product information. This makes it possible to designate processing desired by a user for each event, and hence to improve the operational efficiency.

Further, the event table can be rewritten. Therefore, the electronic product information can be arranged at a desired position to improve the extension flexibility and serviceability.

BRIEF DESCRIPTION OF THE DRAWINGS

Embodiments of the present invention will be described in detail based on the following figures, wherein:

FIG. 4 illustrates a table configuration of an LUT;

FIG. 7 illustrates an example of the LUT before and after the rewriting;

FIG. 12 shows referents of the respective contents shown in FIG. 11;

DETAILED DESCRIPTION OF THE INVENTION

Embodiment of a product information providing apparatus and method is now described in detail with reference to the attached drawing.

The product information providing apparatus according the present invention is applicable to provide specific information items from electronic product information containing various information such as operation manuals, electronic catalogs, and maintenance-related information.

The product information providing apparatus for providing electronic product information is typified by a multi-function apparatus such as a camera, a video, a FDA (Personal Digital Assistance), and a printer. However the product information providing apparatus according to the present invention is also applicable to various other types of electronic equipment. Description below will be made by using a printer as an example.

Figure 1:
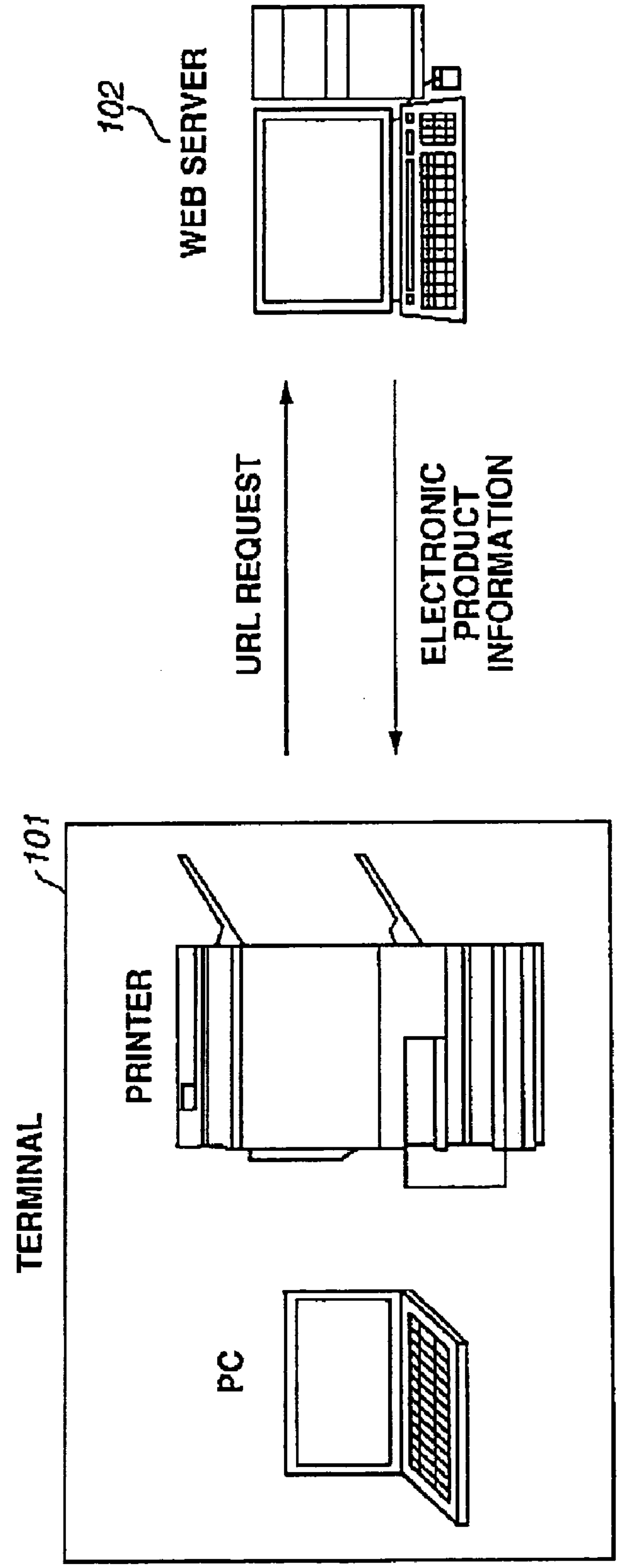
FIG. 1 is a block diagram of a system to which a product information providing apparatus and method according to the present invention are applied.

FIG. 1 is a block diagram of a system which is constructed by employing the product information providing apparatus and method according to an embodiment of the preset invention.

In FIG. 1, a printer is illustrated as the product information providing apparatus (electronic equipment), which provides users with electronic product information formed by texts, animation, still images, voice, sound effects, music, and control data used for internal processing. The electronic product information provides more detailed information than a corresponding operation manual.

The system includes a printer 101 which transmits a request to display the electronic product information, obtains the most appropriate electronic product information, and provides a user with the obtained information, and a Web server 102 which stores the electronic product information, and searches and manages electronic product information items corresponding to the electronic product information display request from the printer 101.

The electronic product information display request generated by the printer 101 is transmitted to the Web server 102. Upon receiving the request, the Web server 102 searches an electronic product information item corresponding to the request, and transmits the electronic product information item thus found to the printer 101. Upon receipt thereof, the printer 101 provides the user with the received electronic product information item. The electronic product information is provided to the user by a technology used for forming the electronic product information. For example, if the electronic product information is formed by texts, animation, and voice, the electronic product information is provided to the user by displaying the texts and reproducing the animation data and voice data.

This enables the printer 101 to provide electronic product information in a more user-friendly manner.

Figure 2:
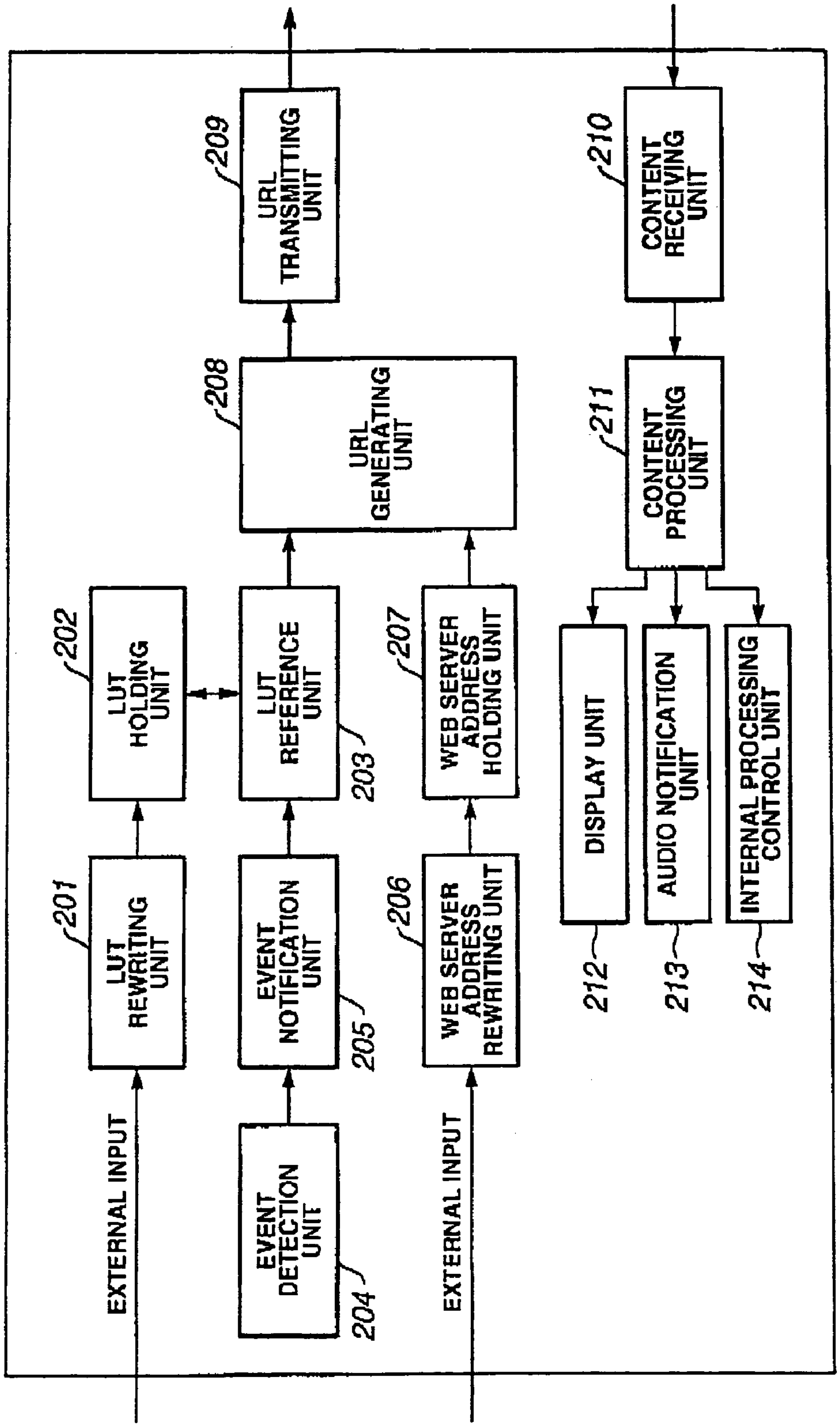
FIG. 2 shows a configuration of the printer shown in FIG. 1.

FIG. 2 shows a detailed configuration of the printer 101 shown in FIG. 1.

In FIG. 2, the printer 101 is illustrated in an example in which the printer is used with an application on a client PC.

The printer in FIG. 2 includes an LUT rewriting unit 201, an LUT holding unit 202, an LUT reference unit 203, an event detection unit 204, an event notification unit 205, a Web server address rewriting unit 206, a Web server address holding unit 207, a URL generating unit 208, a URL transmitting unit 209, a content receiving unit 210, a content processing unit 211, a display unit 212, an audio notification unit 213, and an internal processing control unit 214.

The LUT rewriting unit 201 is capable of rewriting, in response to an external input, an LUT (Look Up Table) in which each event which may occur is associated with a referent address to be referred to based on the event. In other words, the LUT rewriting unit 201 is capable of changing the referent address to be referred to according to an event having occurred.

If the event having occurred is "error A", for example, the referent corresponding to this event can be changed from the existing referent address "a" to new referent address "b". Further, if the LUT indicates "NULL" meaning that no referent address is set for an event "error B", for example, a referent address "c" can be newly added to the LUT.

The LUT holding unit 202 is formed by a non-volatile memory typified by an NVRAM (Non Volatile Random Access Memory), and holds an LUT which defines a referent address to be referred to when an event has occurred. The LUT is referred by the LUT reference unit 203. The respective referent addresses corresponding to the events are represented by relative addresses to the top page of the electronic product information.

When the top page address of the electronic product information is "http://www.commodity-top.co.jp/index.html", for example, the referent is managed with a relative address of "./printer/tonner/tonner1.html".

In this manner, the link relationship can be maintained no matter where the top page of the electronic product information is arranged.

The LUT reference unit 203 refers the LUT held by the LUT holding unit 202 upon occurrence of an event. The LUT reference unit 203 acquires a referent address (relative address) corresponding to the event having occurred and sends the referent address (relative address) to the URL generating unit 208. If there is no referent address (relative address) corresponding to the event, the LUT reference unit 203 may refer to a referent designated in advance, or may not refer to any referent for some events which need no referent at all.

The event detection unit 204 detects an event that has occurred in the printer. For example, the event detection unit 204 detects, during print-out operation of the printer, a paper-jam event when printing paper has jammed or a toner-out event when toner has run out. The event detection unit 204 also detects a normal completion event when print-out operation has been completed normally in response to a print request. The events detected by the event detection unit 204 respectively correspond to the events listed in the LUT held by the LUT holding unit 202.

The event notification unit 205 notifies the LUT reference unit 203 of the event detected by the event detection unit 204. The event notification unit 205 is also capable of discriminating events to be notified and events not to be notified. For example, if the normal completion event, meaning that a function of the printer has been executed and completed normally, is set as an event which need not be notified, the event notification unit 205 will not notify the event.

The Web server address rewriting unit 206 rewrites an address of a Web server which stores the electronic product information. The Web server address is represented by an address going to the top page of the electronic product information.

For example, a business user who has purchased the electronic product information may utilize the same on its own Web server, or may utilize the same on a Web server of the maker selling the electronic product information. In this case, the electronic product information may be arranged at the top of the Web server or at a lower hierarchy level. In either case, the electronic product information may be arranged at a desired position so as to be well balanced with other contents of the Web server.

The Web server address holding unit 207 is formed by a non-volatile memory as typified by an NVRAM (Non Volatile Random Access Memory), and holds an address of a Web server which stores the electronic product information The Web server address can be rewritten by the Web server address rewriting unit 206.

The URL generating unit 208 generates an absolute address of the electronic product information item to be referred to for an event which has occurred. Specifically, the URL generating unit 208 generates an absolute address (URL (Uniform Resource Locator) of the electronic product information by merging the referent address (relative address) for the event held by the LUT holding unit 202 with the address indicating the top page of the electronic product information held by the Web server address holding unit 207.

For example, when the referent relative address for the "error A" held by the LUT holding unit 202 is "./printer/tonner/tonner1.html", and the address indicating the top page of the electronic product information held by the Web server address holding unit 207 is "http://www.commodity-top.co.jp/index.html", the absolute address (URL) of the electronic product information generated by merging those two addresses is "http://www.commodity-top.co.jp/printer/tonner/tonner1.html".

The absolute address (URL) thus generated is transmitted to the URN transmitting unit 209.

The URL transmitting unit 209 transmits a request containing the generated URL to the Web server storing the electronic product information. In response to this, the Web server 102 returns to the printer the electronic product information based on the URL.

The content receiving unit 210 receives the electronic product information which has been sent as a response to the request. The received electronic product information is transmitted to the content processing unit 211.

The content processing unit 211 processes the electronic product information. For example, if the content of the received electronic product information is formed by texts, animation, voice, and still images, the content processing unit 211 processes the electronic product information so that the texts, animation and still images are displayed by the display unit 212, and the voice is reproduced by the audio notification unit 213. If the electronic product information is control data used for internal processing, the internal processing control unit 214 executes the internal processing. This makes it possible to update the control parameters, the control program, or the firmware of the printer.

The display unit 212 displays a text, animation, voice, a still image or the like, in response to the display request from the content processing unit 211.

The audio notification unit 213 is formed by a speaker or the like, and reproduces the voice, music, or sound effects contained in the electronic product information.

The internal processing control unit 214 executes internal processing when the electronic product information is "control data used for internal processing". The control data includes, for example, data for updating the control parameters or data for updating the control program. The internal processing control unit 214 executes internal processing based on the received data.

According to the configuration as described above, the electronic product information may be formed by texts, animation, still images, voice, sound effects, music, control data used for internal processing and so on. Therefore, the electronic product information having an abundant amount of information can be provided to the user. The electronic product information items generated in an abundant amount of information are set respectively in relative addresses in association with the events, and thus each item can be arranged at a desired position by setting so the top page of the electronic product information.

This makes it easy to search an item of the product information, and to update the product information. Additionally, this improves the security as well as the usability of the printer.

The configuration as described above and illustrated in FIGS. 1 and 2 saves the user the trouble of referring to a different part of an operation manual or the like for each occurrence of an event, and allows the user to obtain display of the electronic product information most suitable for each event and to easily perform what is necessary.

Figure 3:
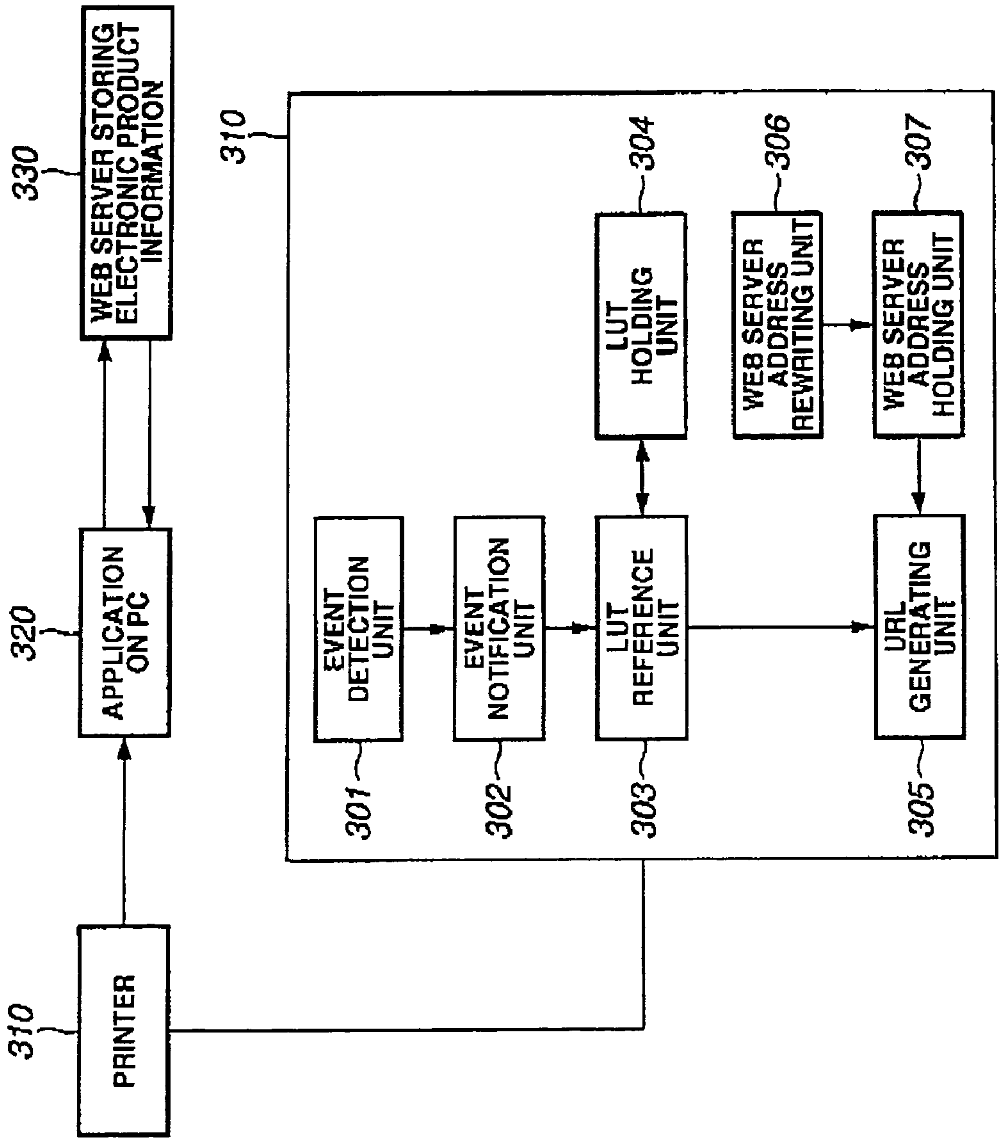
FIG. 3 is a block diagram illustrating a method to rewrite a Web server address held by the Web server address holding unit shown in FIG. 2 with the use of a firmware of the printer.

FIG. 3 is a block diagram illustrating a method of rewriting the Web server address held by the Web server address holding unit 207 shown in FIG. 2.

The configuration in FIG. 3 includes a printer 310, an application 320 operating on a client PC, and a Web server 330 for managing and storing the electronic product information. In response to occurrence of an event in the printer 310, electronic product information corresponding to the event is obtained from the Web server 330, and the electronic product information thus obtained is displayed on the client PC 320.

For example, if the event having occurred in the printer 310 is "paper near end" or "paper out", an item of the electronic product information corresponding to the event is obtained from the Web server 330 and displayed on the client PC 320. The user is thereby allowed to perform what is necessary, based on the displayed electronic product information. Specifically, a paper purchase page is displayed as the electronic product information to allow the user to perform the procedure to purchase paper if he/she wants.

This means that the user is not required to look for a manual or make a telephone call for purchasing paper, and is allowed to perform the purchase procedure in an easy way. Further, the paper purchase page of the electronic product information can be customized in conformity with the use environment of a business or individual user to realize more efficient use of the printer.

A business user, for example, may customize the paper purchase page as a page for procuring paper so that a section manager or personnel in charge of paper procurement can rapidly make arrangement to procure paper. Further, the system may be designed such that the electronic product information relating to bulk purchase is displayed to the section manager or personnel in charge of paper procurement in response to occurrence of a relevant event, that is, when more than a prescribed amount of paper has been procured. This will facilitate the bulk purchase of paper, decreases the purchase price and eliminate the trouble of getting an invoice and making arrangement for purchase by each section or department of the company.

The firmware mounted on the printer 310 includes an event detection unit 301, an event notification unit 302, an LUT reference unit 303, an LUT holding unit 304, a URL generating unit 305, a Web server address rewriting unit 306, and a Web server address holding unit 307. This printer firmware corresponds to a part of the printer shown in the detailed block diagram of FIG. 2, that is necessary for rewriting the referent.

The event detection unit 301 detects an event that has occurred in the printer, for example, a "paper near end" event indicating that paper is running out, or a "paper-jam" event indicating that paper has jammed.

The event notification unit 302 notifies the LUT reference unit 303 of the event detected by the event detection unit 301. As also shown in FIG. 2, the event notification unit 302 may discriminate events to be notified and events not to be events so that the LUT reference unit 303 is notified of only an event that is determined to be notified.

The LUT reference unit 303 refers to the LUT (Look Up Table) held by the LUT holding unit 304.

The LUT holding unit 304 holds an LUT in which each event is associated with a referent address of an item of the electronic product information corresponding to the event. An example of the LUT is shown in FIG. 4, in which each referent is set in a relative address.

The URL generating unit 305 generates a full address (absolute address) of an item of the electronic product information corresponding to an event detected by the event detection unit 301 by merging the Web server address held by the Web server address holding unit 307 and the referent address of the electronic product information item corresponding to the event held by the LUT holding unit 304.

The Web server address rewriting unit 306 is able to rewrite the Web server address held by the Web server address holding unit 307 in response to an external input. The rewritten Web server address is reflected to and held by the Web server address holding unit 307.

According to the configuration as described above, the referent address (relative address) held by the LUT holding unit 304 and the Web server address held by the Web server address holding unit 307 can be rewritten by the Web server address rewriting unit 306 so as to be arranged in a position suitable for the use environment of the user.

The electronic product information may be stored not only in the Web server but also in the printer 310 events of which are to be detected or in the client PC.

FIG. 4 illustrates a table structure of the LUT.

FIG. 4 defines the contents of events received from the printer and referent addresses of respective electronic product information items which are displayed in response to the events.

When the event received from the printer is "Error 1", for example, the referent address of the electronic product information to be displayed is indicated by a relative address as "./printer-manual/product1/error/error1.html". The referent address of each electronic product information item is defined by a relative address to a certain standard address. The certain standard address is an address indicating a location where the electronic product information is stored in the Web server, and the absolute address of the electronic product information is determined by this Web server address.

For example, a page indicated by "error1.html" is the page of the electronic product information item corresponding to the paper-jam event. If the page is formed by texts and animation, the electronic product information item corresponding to the paper jam is displayed by means of animation to the user, whereby the user is allowed to perform what is necessary more reliably and more easily. The use of means such as animation that helps intuitive understanding will facilitate comprehension of the product information and allow the user to perform what is necessary in an efficient manner.

The rewriting means as described above and shown in FIGS. 3 and 4 makes it possible to arrange the electronic product information at a desired position. Even if the electronic product information is arranged in the Web server, the user can retrieve a necessary information item instantaneously to perform appropriate processing easily.

FIG. 5 illustrates an example of a method of rewriting the Web server address by the Web server address rewriting unit 206 shown in FIG. 2.

Figure 5A:
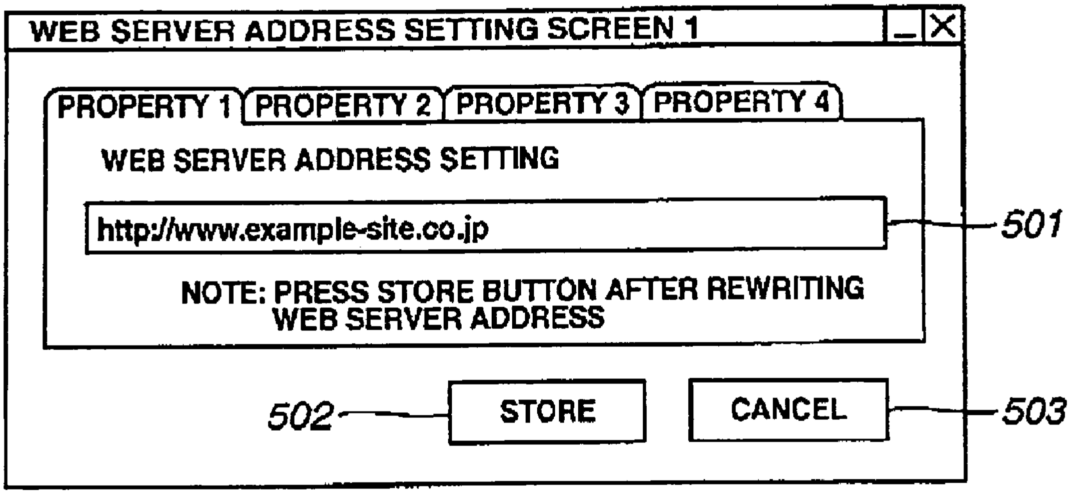
FIG. 5 illustrates an example of a method of rewriting a Web server address with the use of the Web server address rewriting unit shown in FIG. 2.
Figure 5B:
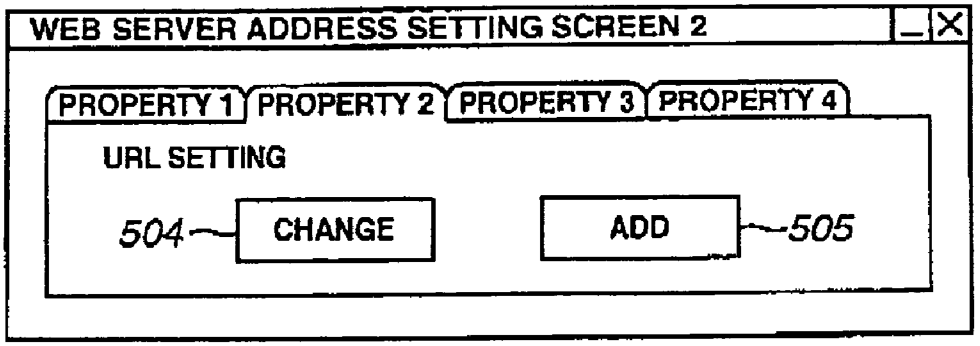

In FIG. 5, FIG. 5A shows a screen which is displayed by a "property 1" tab on the property screen of the printer driver. This screen is for rewriting the Web server address. FIG. 5B shows a screen displayed by a "property 2" tab. This screen is an instruction screen for performing rewriting (change) of or addition to the LUT.

The screen shown in FIG. 5A includes a Web server address setting box 501, a STORE button 502, and a CANCEL button 503. The setting box 501 can be pointed by a pointing device such as a mouse to enable text entry to rewrite the Web server address. The STORE button 502 is pressed to reflect the rewritten Web server address to the LUT holding unit 202.

The screen shown in FIG. 5B includes a CHANGE button 504 and an ADD button 505. When the CHANGE button 504 is pressed, the screen will jump to a screen enabling rewriting of the LUT. When the ADD button 505 is pressed, the screen will jump to a screen enabling addition of electronic product information for events in the LUT.

Figure 8A:
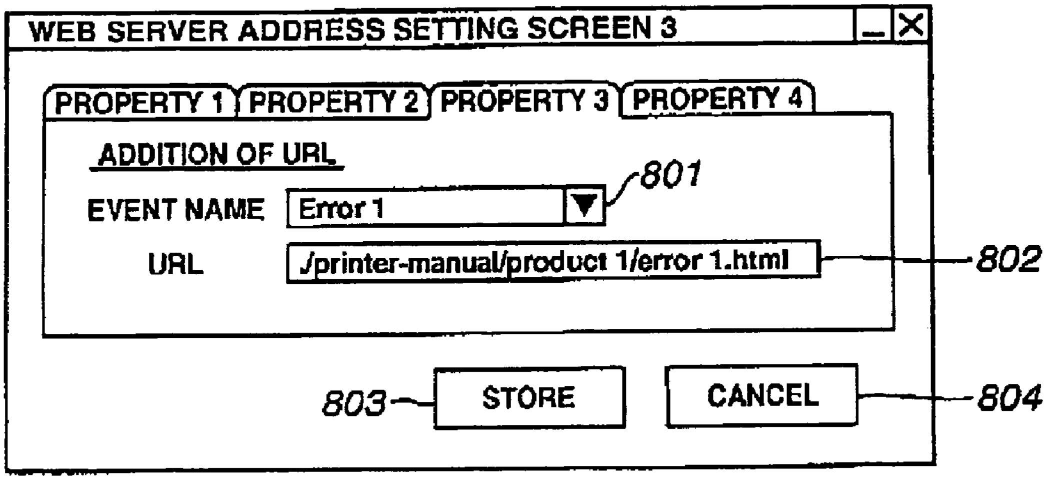
FIG. 8 illustrates a method of performing the rewriting with the use of an application on a client PC in place of the LUT rewriting unit shown in FIG. 6.
Figure 8B:
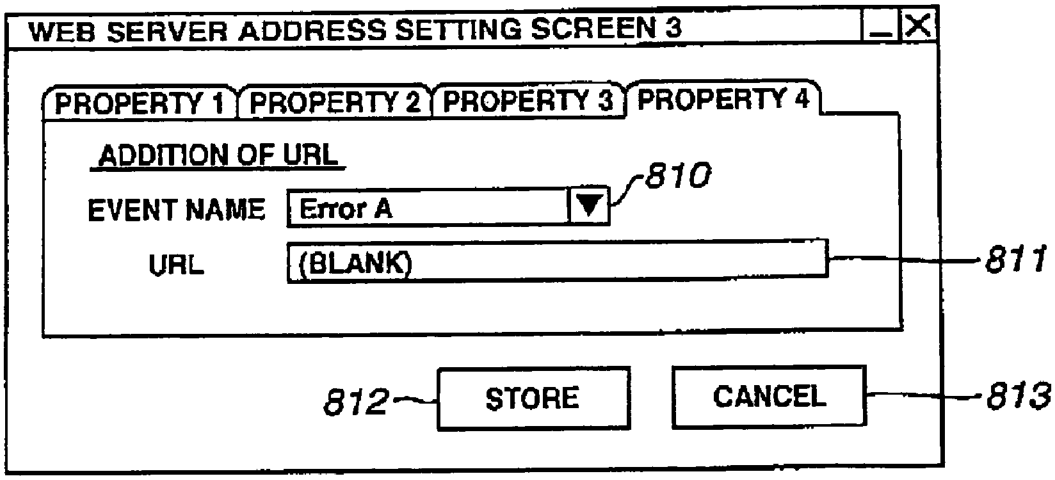

An example of the screen enabling rewriting of the LUT is shown in FIG. 8A, while an example of the screen enabling addition of electronic product information is shown in FIG. 8B.

Figure 6:
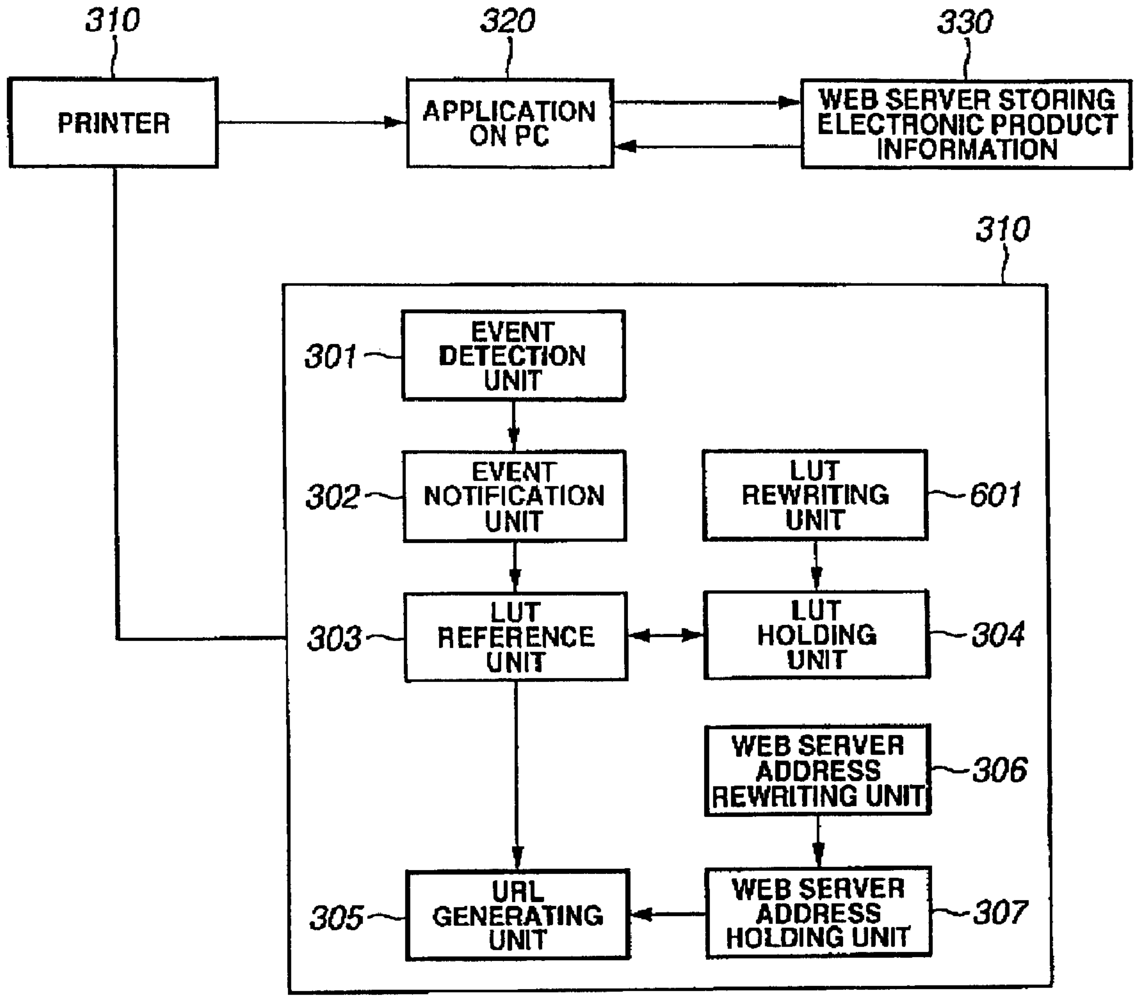
FIG. 6 is a block diagram illustrating a method of rewriting a referent address for electronic product information of the LUT held by the LUT holding unit shown in FIG. 2.

FIG. 6 is a block diagram illustrating a method of rewriting the referent address of the electronic product information in the LUT held by the LUT holding unit 202 shown in FIG. 2.

The configuration shown in FIG. 6 is equivalent to the configuration shown in the block diagram of FIG. 3 except for an LUT rewriting unit 601 being newly added. Therefore, the following description will be focused on the LUT rewriting unit 601.

The LUT rewriting unit 601 is able to rewrite the LUT which is held by the LUT holding unit 304 and is composed of events possibly occurring in the printer and referent addresses of electronic product information items for the respective events.

For example, the LUT before rewriting is shown in FIG. 7A while the LUT after rewriting is shown in FIG. 7B. In the LUT before rewriting, the referent address of the electronic product information item for the “Error 1” event is “./printer-manual/product1/error/error1.html” whereas, in the LUT after rewriting, the referent address of the electronic product information item for the “Error 1” event has been rewritten to “./printer-manual/product1/error/renrakusaki.html”.

Further, in the LUT before rewriting, “NULL”, meaning that there is no referent, is indicated for the “Error 3” event. Whereas, in the LUT after rewriting, the “Error 3” event is associated with “./printer-manual/product1/error/error3.html” as the referent address of electronic product information.

By rewriting the LUT in this manner, it is made possible to change the display to be shown upon occurrence of an event. For example, when the original LUT setting is such that a troubleshooting method is displayed upon occurrence of the “Error 1” event, the setting may be changed to display a contact address of the dealer for requesting service.

The rewriting of the Web server address and the LUT referent address as described above and illustrated in FIGS. 3 and 5 enables the printer to display desired information suitable for the use environment of the user without the need of searching it.

FIG. 8 illustrates a method of performing the rewriting with the use of an application on the client PC instead of with the use of the LUT rewriting unit 601 as shown in FIG. 6.

In FIG. 8, FIG. 8A shows a screen which is displayed by the “property 3” tab of the property screen of the printer driver, and which enables rewriting of the LUT. This screen includes an event selecting pulldown list box 801, a referent text box 802, a STORE button 803, and a CANCEL button 804. The screen can be displayed not only by selecting the “property 3” tab, but also by pressing the CHANGE button 504 of the screen shown in FIG. 5B.

The event selecting pulldown list box 801 is for selecting an event the referent address of which is to be rewritten from the list.

The referent text box 802 displays the referent address of the electronic product information item corresponding to the event selected from the event selecting pulldown list box 801, so that the displayed referent address can be rewritten. The referent address is rewritten in a relative address.

The STORE button 803 is for storing the content of the rewriting that has been done by the event selecting pulldown list box 801 and the referent text box 802. The rewritten content is reflected to and stored in the LUT held in the LUT holding unit 202.

FIG. 8B shows a screen which is displayed by the “property 4” tab on the property screen of the printer driver. The screen includes an unset event selecting pulldown list box 810, an unset referent text box 811, a STORE button 812, and a CANCEL button 813.

This screen allows the user to set a referent address of electronic product information for an event for which no referent address has been set.

The unset event selecting pulldown list box 810 is a pulldown list box which allows only selection of an event for which no URL is set in the LUT, that is, for which NULL is set.

The unset referent text box 811 allows the user to set the referent address of the electronic product information item corresponding to the event selected by the unset event selecting pulldown list box 810.

Upon pressing the STORE button 812 after selecting an event for which no referent address is set by the unset event selecting pulldown list box 810, and setting a referent for the selected event by the unset referent text box 811, the content of the setting is reflected to the LUT and stored.

The referent address of the electronic product information which is set by using the screen shown in FIG. 8B may be rewritten, if necessary, by using the screen shown in FIG. 8A.

Figure 9:
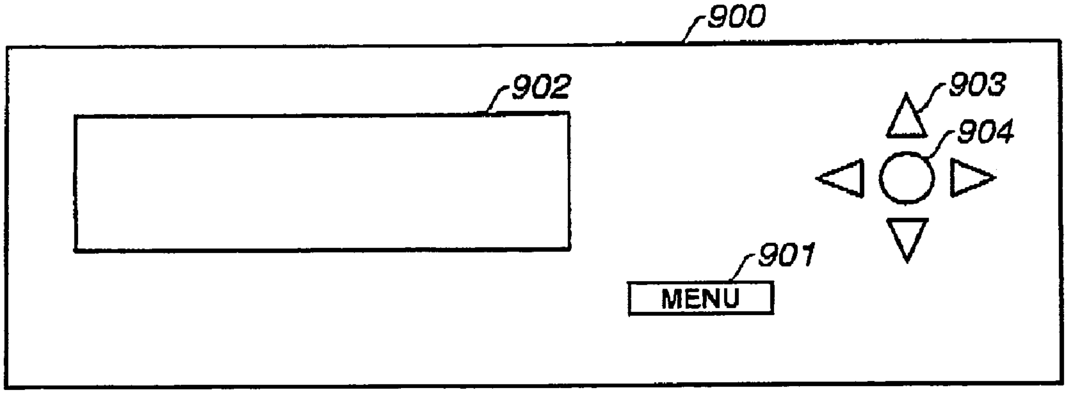
FIG. 9 illustrates a method of performing the rewriting processing with the use of a printer firmware in place of the LUT rewriting unit and the Web server address rewriting unit shown in FIG. 6.

FIG. 9 illustrates a method of performing the rewriting processing by the firmware of the printer instead of by the LUT rewriting unit 601 and the Web server address rewriting unit 306 shown in FIG. 6.

FIG. 9 shows an operation panel 900 which is provided in the printer and includes a MENU ACTIVATE button 901, a display 902, a four-way scroll key 903, and a SETTING CHANGE button 904. The operation panel 900 enables the user to change the Web server address and the referent address of electronic product information.

The MENU ACTIVATE button 901 is a button to be pressed as a trigger when rewriting the Web server address or the referent addresses of the electronic product information. The menu is activated thereby.

The display 902 may be an LCD (Liquid Crystal Display) or the like, which is a user interface to display the content of setting.

The four-way scroll key 903 is used to select an item.

The SETTING CHANGE button 904 is a button for reflecting the changed content of setting.

Figure 10:
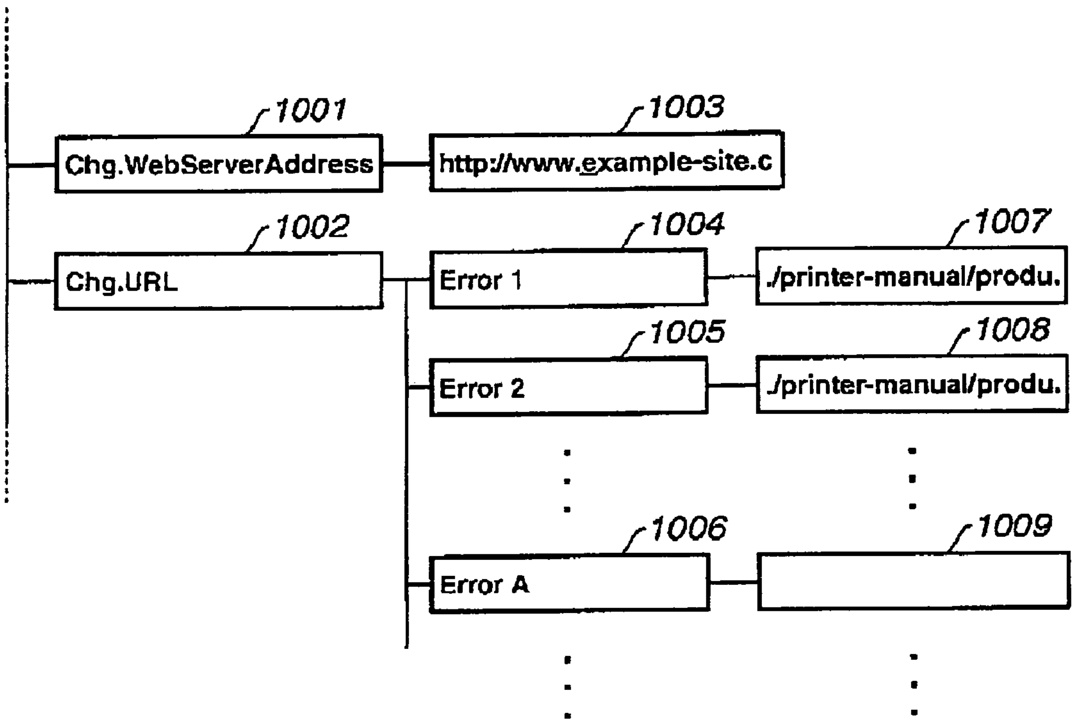
FIG. 10 illustrates a hierarchical structure of a menu.

FIG. 10 shows a hierarchical structure of the menu.

FIG. 10 shows a part of the hierarchical menu structure that is related to the setting of a Web server address and referents of the electronic product information “Chg. Web server Address” menu 1001 for rewriting the Web server address and “Chg. URL” menu 1002 for rewriting the referent address of the electronic product information are arranged in the first stratum of the hierarchical menu structure.

There are arranged, in the second stratum of the “Chg. URL” menu 1002, “Error 1” menu 1004, “Error 2” menu 1005, . . . , and “Error A” menu 1006.

While “http://www.example-site.co.jp” is set as the item of the “Chg. Web Server Address” menu 1001, FIG. 10 shows only partly “http://www.example-site.c” 1003, which reflects the actual state in which it is displayed by the display 902 shown in FIG. 9. This is an example of display when the content to be displayed is too long for the breadth of the display. It is of course possible to display the character string which has not been displayed, by using the four-way scroll key 903. It is also possible to display the same repeatedly.

“./printer-manual/produ” 1007 is indicated as an item of the “Error 1” menu 1004, “./printer-manual/produ.” 1008 is indicated as the menu of the "Error 2" menu 1005, and NULL (unset state) 1009 is indicated as the item of the "Error A" menu 1006.

Description will now be made of procedures for rewriting the menu having the hierarchical structure as shown in FIG. 10, by using the operation panel shown in FIG. 9.

In order to rewrite the Web server address, the MENU ACTIVATE button 901 is press once to activate the menu. Upon the menu being activated, the four-way scroll key 903 is used to display, in the display 902, the "Chg. Web Server Address" menu in the hierarchical structure. The right button of the four-way scroll key 903 is pressed once to display, in the display 902, the address "http://www.example-site.c" that is currently set as the Web server address.

Upon the address being displayed, the cursor is placed on each character to input a desired address. FIG. 10 shows a state in which the cursor is placed on "e" of "http://www.example-site.c" that is currently set in the "Chg. Web Server Address" menu. By pressing the lower button of the four-way scroll key 903, the character pointed by the cursor can be changed from "e" to "f" to "g" to "h" to "i". When all the characters in the character string have been changed in this manner, the change can be reflected to the setting by pressing the SETTING CHANGE button 904.

In order to rewrite the referent address of the electronic product information for the "Error 1" event, the MENU ACTIVATE button 901 is pressed once to activate the menu. Upon the menu being activated, the four-way scroll key 903 is used to display, in the display 902, the "Chg. URL" menu 1002 of the hierarchical structure. The right button of the four-way scroll key 903 is pressed once to display the "Error 1" menu 1004, and then the right button is pressed again to display the referent of the electronic product information which is currently set for the "Error 1" event.

Upon the referent address being displayed, it is rewritten in the same manner as the Web server address. The rewriting can be completed by pressing the SETTING CHANGE button 904.

The rewriting method as illustrated in FIGS. 9 and 10 eliminates the need of providing a special application on the client PC and enables the present invention to be embodied by simple configuration.

Figure 11:
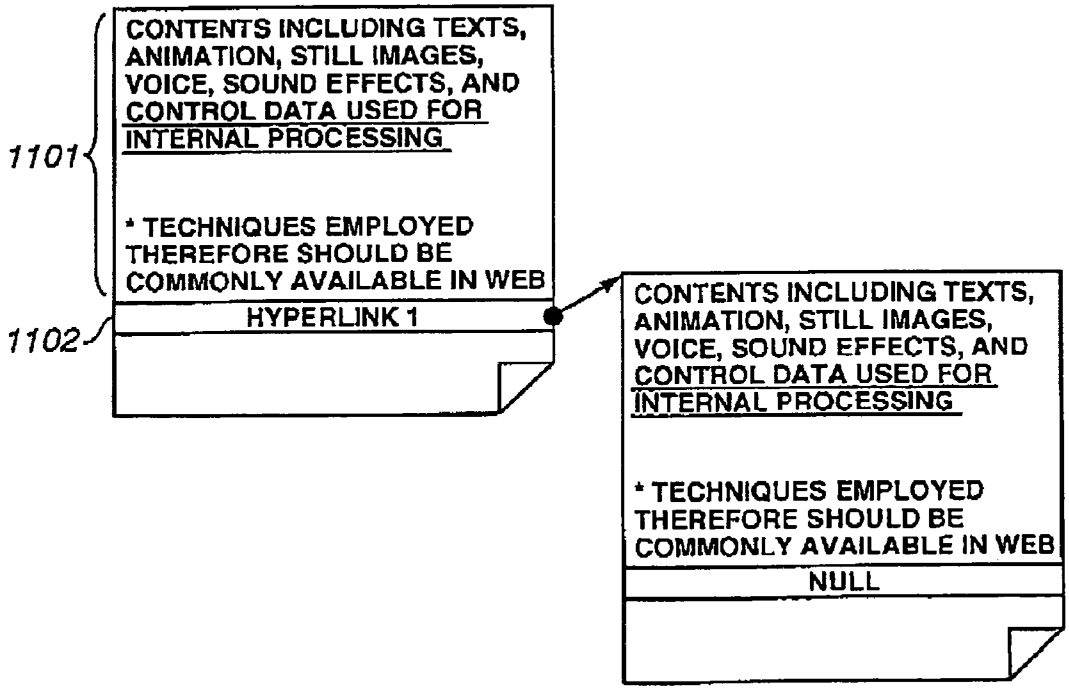
FIG. 11 illustrates the structure of electronic product information.

FIG. 11 illustrates the structure of the electronic product information.

FIG. 11 shows the electronic product information to be displayed in response to an event. The electronic product information is a content which can be composed of a data portion 1101 which may be formed by texts, animation, still images, voice, sound effects, music, and control data used for internal processing, and a pointer hyperlink) 1102 for referring to other contents. The techniques used therefor are generally available as the Web technology.

The pointer (hyperlink) 1102 makes it possible to link the content with other contents. It is of course possible to use a NULL pointer (hyperlink) which provides no linkage between contents.

FIG. 12 shows referents of the contents shown in FIG. 11. Each referent of the contents is represented by a relative address.

In FIG. 12, FIG. 12A shows an example of the relative addresses, while FIG. 12B shows an example of parameter arguments.

In FIG. 12A, "./printer-manual/product1/error/error1.html" is shown as an example of the relative addresses for "Printer Error". When this page is arranged on the Web server of a certain business company (Web server address: http://www.intra-site.co.jp/index.html) to be referred to, the full address of this page, that is, the absolute address thereof will be "http://www.intra-site.co.jp/printer-manual1/product1/error/error1.html".

In FIG. 12B, "./printer-manual1/product1/index.html?error1" is shown as an example of the parameter arguments for "Printer Error".

As seen from the above, a desired content can be displayed by setting a Web server address and a relative address of the content, separately.

Figure 13:
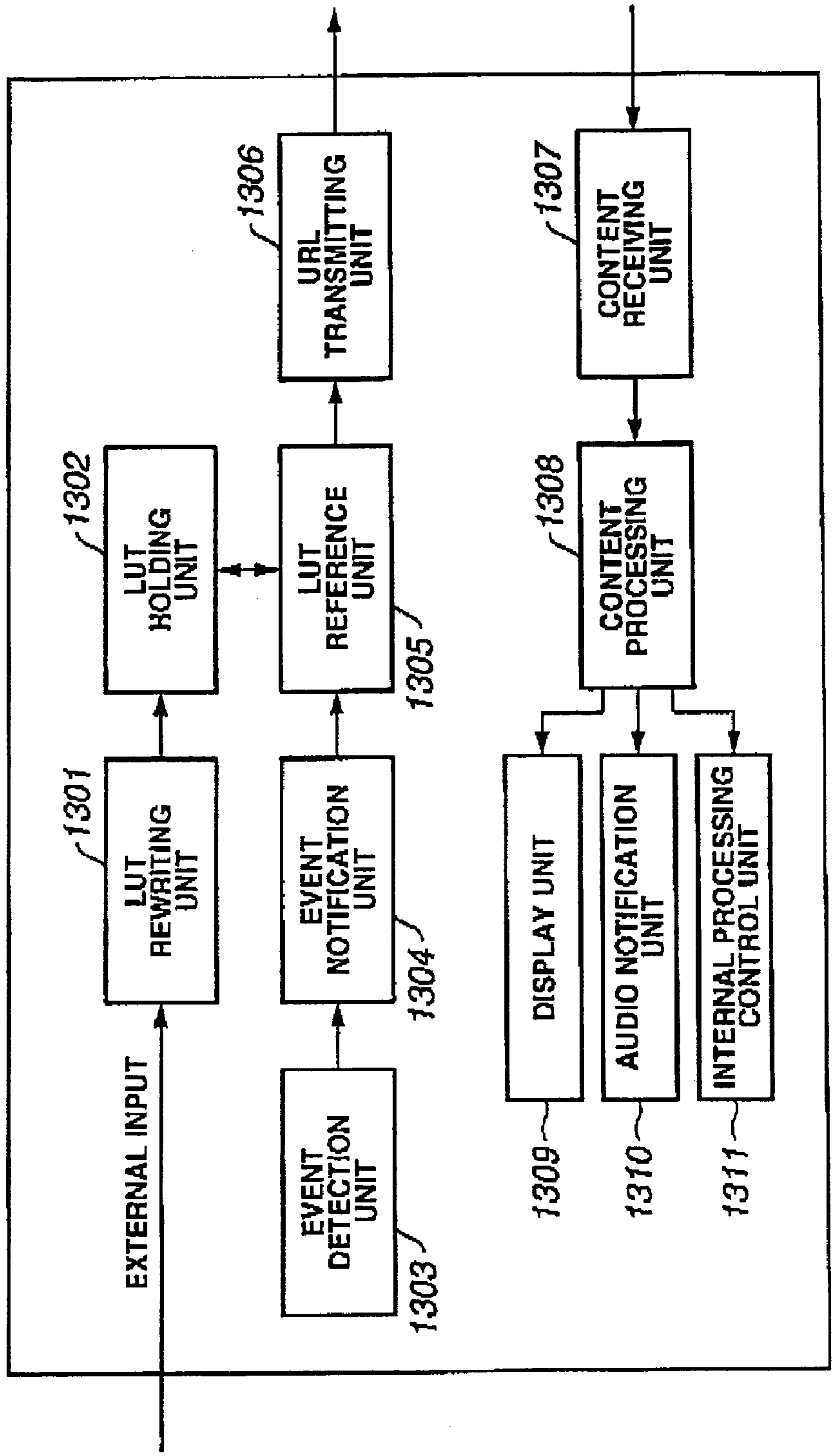
FIG. 13 shows detailed configuration of the printer of FIG. 1 according to another embodiment.

FIG. 13 shows a detailed configuration of the printer of FIG. 1 according to another embodiment.

FIG. 13 is a modification of the block diagram shown in FIG. 2, and hence the following description will be focused on features that are different from FIG. 2.

One of the clear differences between the printers in FIG. 13 and FIG. 2 resides in that the printer in FIG. 13 does not have the Web server address rewriting unit 206 or the Web server address holding unit 207 as in FIG. 2, and that the LUT is designed to hold absolute addresses, or full addresses of the electronic product information including the Web server address.

The printer 101 includes an LUT rewriting unit 1301, an LUT holding unit 1302, an event detection unit 1303, an event notification unit 1304, an LUT reference unit 1305, a URL transmitting unit 1306, a content receiving unit 1307, a content processing unit 1308, a display unit 1309, an audio notification unit 1310, and an internal processing control unit 1311.

The LUT rewriting unit 1301 is able to rewrite the LUT. Upon receipt of an external input, the LUT rewriting unit 1301 rewrites a referent address corresponding to an event having occurred.

The LUT holding unit 1302 is formed by a non-volatile memory as typified by an NVRAM (Non Volatile Random Access Memory), and holds an LUT (Look Up Table) formed by events and referent addresses of the electronic product information for the events. The referent address of the electronic product information set for each of the events is represented by a full address (absolute address) starting from the top page address of the Web server in which the electronic product information is supplied.

For example, if the event having occurred is "error A", "http://www.commodity-top.co.jp/printer/tonner/tonner1.html" is set as the referent of the content. This means that the user is able to access the content directly. In this case, "NULL" also may be set, which indicates that there is no electronic product information available as the referent of the content.

The event detection unit 1303 detects an event which has occurred in the printer 101.

The event notification unit 1304 notifies the LUT reference unit 1305 of the detected event. Like the printer in FIG. 2, it is possible to discriminate events to be notified and events not to be notified.

The LUT reference unit 1305 refers to the LUT held by the LUT holding unit 1302 for the referent address of the electronic product information for the notified event to obtain the corresponding referent. The referent address of the content thus obtained is transmitted to the URL transmitting unit 1306.

The URL transmitting unit 1306 transmits to the Web server 102 a request containing the referent of the electronic product information, that is the full address obtained by the LUT reference unit 1305.

The Web server 102 then outputs to the printer 101 the electronic product information corresponding to the address thus received.

The content receiving unit 1307 receives the electronic product information output by the Web server 102, and transmits the same to the content processing unit 1308.

The content processing unit 1308 processes the received electronic product information. For example, if the received electronic product information is formed by texts, animation, and still images, the content processing unit 1308 processes the electronic product information so that the text, animation, and still images are displayed by the display unit 1309 and the animation sound is reproduced by the audio notification unit 1310. Further, if the electronic product information is control data used for internal processing, the content processing unit 1308 causes the internal processing control unit 1311 to perform the internal processing. This processing is capable of updating the control parameters, the control programs, and the firmware of the printer.

The configuration described above makes it possible to collectively perform all the maintenance jobs to rewrite the addresses in conformity with the use environment of the user without the need of generating a referent URL of an absolute address every time a reference is made. Thus, the processing can be performed more rapidly.

The processing as described above allows the product information providing apparatus (printer) according to the present invention to easily provide electronic product information most suitable to the use environment of the user.

Further, according to the present invention, the referent addresses of the electronic product information items and the address of the Web serves storing the electronic product information can be freely rewritten, and the electronic product information items are hyperlinked with each other to link the individual products. Consequently, the product information providing apparatus according to the present invention is capable of providing a necessary information item, which is different from one user to another, at necessary timing. Furthermore, it is made easier for the user to access more detailed information and to retrieve the most appropriate information from a vast amount of information.

As a result, the usability for users can be improved and the operational efficiency is enhanced.

Generally speaking, the most important purpose of a user to use a printer is to print out documents. The user usually does not like to refer to an operation manual or to spend time every time he/she needs to purchase consumables or every time a trouble has occurred. These problems can be solved at once by applying the present invention. Specifically, the referent addresses corresponding to the events can be rewritten so that appropriate processing can be performed with the most suitable procedures and method.

The processing as described above and illustrated in the diagrams can also be performed by an information management program executable on a computer.

The present invention is not limited to the embodiments as described above and illustrated in the accompanying drawings. It is to be understood that various changes and modifications may be made without departing from the spirit and scope of the invention.

Figure 14:
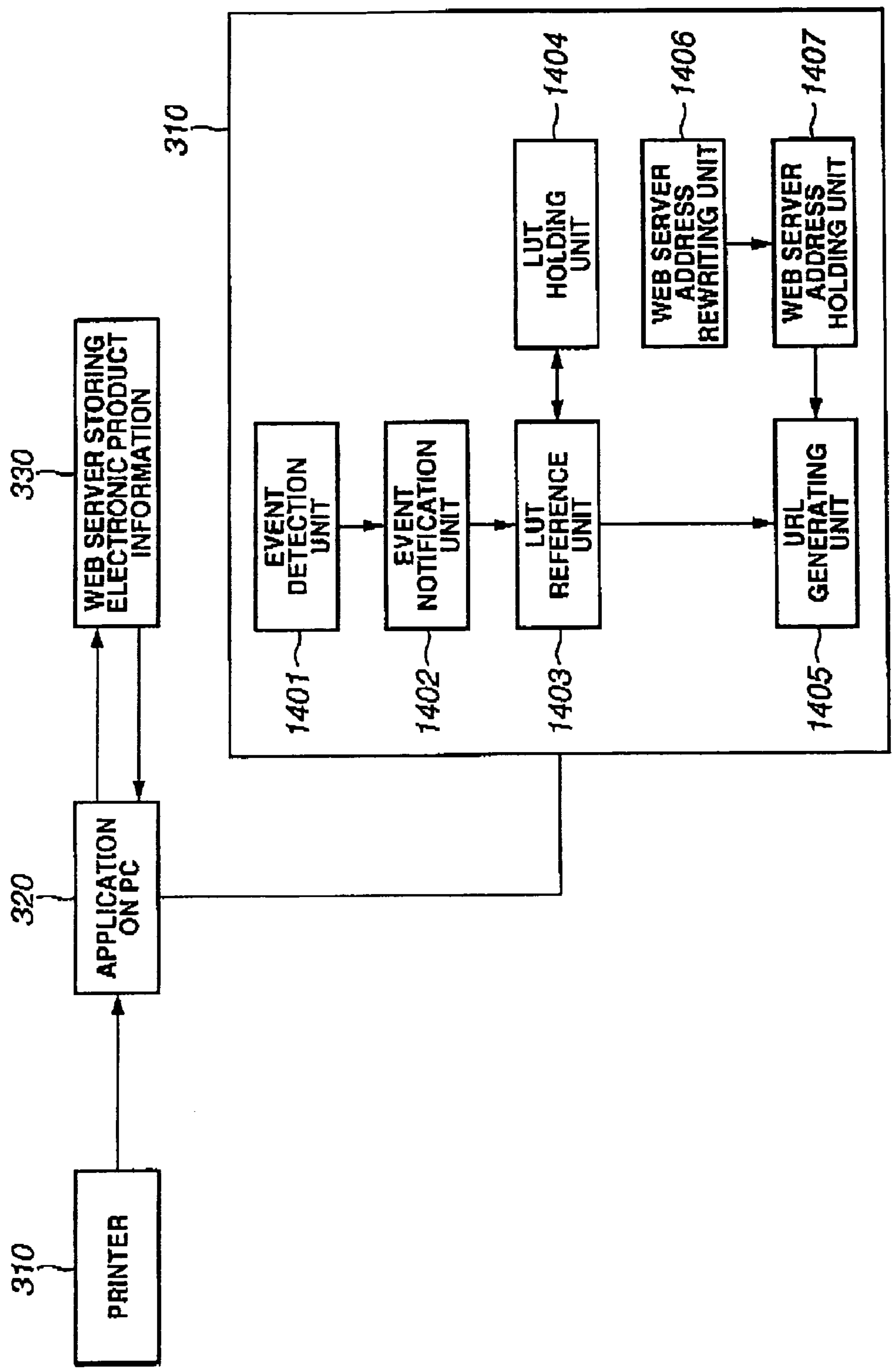
FIG. 14 is a block diagram illustrating a method of rewriting a Web server address held by the Web server address holding unit shown in FIG. 2 with the use of an application on a client PC.

For example, in FIG. 3 showing the first embodiment, the present invention is incorporated in the firmware of a printer. However, the present invention may be implemented in an application on a client PC connected with the printer by a network circuitry as shown in FIG. 14.

In this case, an event which has occurred in the printer is received by an event receiving unit 1401, and the received event is sent to an event notification unit 1402 to obtain a referent address of electronic product information corresponding to the received event. The event notification unit 1402 notifies an LUT reference unit 1403 of the event so that the referent address of the electronic product information corresponding to the notified event is obtained from the LUT held by an LUT holding unit 1404.

The referent address (relative address) thus obtained is transmitted to a URL generating unit 1405.

A Web server address rewriting unit 1406 is able to rewrite the Web server address held by a Web server address holding unit 1407. The URL generating unit 1405 merges the Web server address held by the Web server address holding unit 1407 and the referent address of the electronic product information sent by the LUT reference unit 1403 to generate a full address (absolute address) of the electronic product information.

The generated full address is sent from the application on the client PC to the Web server, and the Web server sends the electronic product information at this address to the client PC.

The client PC notifies the user of the electronic product information thus received from the Web server.

The present invention may be embodied in the form as described above. The Web server may be operated on the client PC.

The present invention is applicable to a product information providing apparatus and method for providing electronic product information using a common Web technology.

The present invention is in particular useful for generating electronic product information that is proprietary information possessed by a business company or the like with the use of an existing Web technology and for accessing desired information from the electronic product information.

As described above, according to an aspect of the present invention, a product information providing apparatus for providing, via a network, product information for supporting operations of a product, comprises an electronic product information storage that stores electronic product information which contains a group of hierarchized files having a file format browsable through a Web browser, the group of hierarchized files being associated with each other by a link structure formed with the use of address information; a table holder that holds an event table in which an event indicating a change in the state of the product is associated with address information of the product information corresponding to the event; an event detector that detects occurrence of the event; an address information acquisition unit that acquires address information corresponding to the event detected by the event detector by referring to the table holder; an accessing unit that accesses the corresponding electronic product information based on the address information acquired by the address information acquisition unit; and a display that displays the electronic product information accessed by the accessing unit.

According to another aspect of the present invention, in the product information providing apparatus according to the first-mentioned aspect of the present invention, each of the files contained in the electronic product information stored by the electronic product information storage is formed by various types of information including animation and voice; and the link structure formed with the use of the address information is rewritable as required.

According to still another aspect of the present invention, in the product information providing apparatus according to the first-mentioned aspect of the present invention, the product is a printer; and the product information providing apparatus is provided in any one of the printer, a Web server connected to the printer via a network, and a client terminal or divided into parts which are separately provided in at least two of the printer, the Web server, and the client terminal.

According to yet another aspect of the present invention, in the product information providing apparatus according to the first-mentioned aspect of the present invention, the table holder, the event detector, the address information acquisition unit, the accessing unit, and the display are provided in a client terminal connected to the product via a network; and the event detector detects occurrence of an event by receiving, from the product, the occurrence of the event detected in the product.

According to even another aspect of the present invention, in the product information providing apparatus according to the first-mentioned aspect of the present invention, a table rewriter is further provided that rewrites the event table held by the table holder.

According to even still another aspect of the present invention, in the product information providing apparatus according to even another aspect of the present invention, the table rewriter rewrites a relative address forming the link structure into an absolute address.

According to even yet another aspect of the present invention, in the product information providing apparatus according to the first-mentioned aspect of the present invention, a Web server address holder is further provided that holds a Web server address of a Web server in which the electronic product information is stored, wherein the table holder holds, as the address information, a relative address to the Web server address held by the Web server address holder.

According to further aspect of the present invention, in the product information providing apparatus according to the first-mentioned aspect of the present invention, an address generator is further provided that merges the Web server address held by the Web server address holder and the relative address for the electronic product information held by the table holder, wherein the accessing unit accesses the address merged by the address generator.

According to still further aspect of the present invention, in the product information providing apparatus according to the even yet another aspect of the present invention, the Web server address is an address going to top page of the electronic product information.

According to yet further aspect of the present invention, in the product information providing apparatus according to the even yet another aspect of the present invention, a server address rewriter is further provided that rewrites the Web server address held by the Web server address holder.

According to even further aspect of the present invention, in the product information providing apparatus according to the first-mentioned aspect of the present invention, the electronic product information is control data which is used for internal processing of the product.

According to even still further aspect of the present invention, a product information providing method for providing, via a network, product information for supporting operations of a product, comprises storing, an electronic product information storage, electronic product information which contains a having a file format browsable through a Web browser, the group of hierarchized files being associated with each other by a link structure formed with the use of address information; holding, by a table holder, an event table in which an event indicating a change in a state of the product is associated with address information of the product information corresponding to the event; detecting, by an event detector, occurrence of the event; acquiring, by an address information acquisition unit, address information corresponding to the event detected by the event detector by referring to the table holder; accessing, by an accessing unit, the corresponding electronic product information based on the address information acquired by the address information acquisition unit; and displaying, on a display, the electronic product information accessed by the accessing unit.

The forgoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

The entire disclosure of Japanese Patent Application No. 2005-40963 filed on Feb. 17, 2005 including specification, claims, drawings and abstract is incorporated herein by reference in its entirety.

What is claimed is:

1. A product information providing system, comprising:

a product information providing apparatus that provides electronic product information for supporting operations of a product; and a Web server that is connected to the product information providing apparatus via a network, wherein the Web server comprises:

an electronic product information storage that stores a group of files which are hierarchized and are associated with each other by a link structure, have a file format browsable through a Web browser of the product information providing apparatus and contain the electronic product information, each file of the group of files including an absolute address which consists of a first address indicating an address of a top page of the Web server and a second address indicating a relative address to the first address, and the product information providing apparatus comprises:

a memory that stores the first address;

a table holding unit that holds an event table in which an event relating to a change in a state of the product is associated with the second address;

an event detection unit that detects occurrence of an event relating to a change in the state of the product;

an acquisition unit that acquires the second address corresponding to the event detected by the event detection unit from the event table held by the table holding unit;

a generating unit that generates the absolute address based on the first address stored in the memory and the second address acquired by the acquisition unit; and an accessing unit that accesses corresponding electronic product information stored in the electronic product information storage based on the absolute address generated by the generating unit.

2. The product information providing system according to claim 1, further comprising:

a first rewriting unit that changes the first address stored in the memory; and a second rewriting unit that changes, adds and deletes the association of an event relating to a change in the state of the product with the second address in the event table held by the table holding unit.

3. The product information providing system according to claim 1, wherein the product is a printer; and the electronic product information includes control data which is used for internal processing of the printer.

4. A product information processing apparatus which is connected to an electronic product information storage in which a group of files are hierarchized and are associated with each other by a link structure, store electronic product information for supporting operations of a product and have a file format browsable through a Web browser, each file of the group of files including an absolute address which consists of a first address indicating an address of a top page of a Web server and a second address indicating a relative address to the first address, comprising:

a memory that stores the first address;

a table holding unit that holds an event table in which an event relating to a change in a state of the product is associated with the second address;

an event detection unit that detects occurrence of an event relating to a change in the state of the product;

an acquisition unit that acquires the second address corresponding to the event detected by the event detection unit from the event table held by the table holding unit:

a generating unit that generates the absolute address based on the first address stored in the memory and the second address acquired by the acquisition unit; and an accessing unit that accesses corresponding electronic product information stored in the electronic product information storage based on the absolute address generated by the generating unit.

5. The product information processing apparatus according to claim 4, further comprising:

a first rewriting unit that changes the first address stored in the memory; and a second rewriting unit that changes, adds and deletes the association of an event relating to a change in the state of the product with the second address in the event table held by the table holding.

6. The product information processing apparatus according to claim 4, wherein the product is a printer; and the electronic product information includes control data which is used for internal processing of the printer.

7. A product information providing method for providing electronic product information for supporting operations of a product, comprising:

storing each file of a group of files, the group of files being hierarchized and associated with each other by a link structure, storing electronic product information for supporting operations of a product and having a file format browsable through a Web browser, in absolute address which consist of a first address indicating an address of a top page of a Web server and a second address indicating a relative address to the first address;

storing the first address in a memory;

holding an event table in which an event relating to a change in a state of the product is associated with the second address;

detecting occurrence of an event relating to a change in the state of the product;

acquiring the second address corresponding to the event occurrence of which is detected from the event table;

generating the absolute address based on the stored first address and the acquired second address; and accessing corresponding electronic product information based on the generated absolute address to provide the electronic product information.

* * * * *

UNITED STATES PATENT AND TRADEMARK OFFICE

CERTIFICATE OF CORRECTION

PATENT NO. : 7,673,014 B2
APPLICATION NO. : 11/179730
DATED : March 2, 2010
INVENTOR(S) : Osamu Fujinawa It is certified that error appears in the above-identified patent and that said Letters Patent is hereby corrected as shown below:

Title Page

Please correct the inventor as follows:

(75) Inventor: Osamu FUJINAWA, Niigata (JP)

Signed and Sealed this

Fourth Day of May, 2010

David J. Kappos

*Director of the United States Patent and Trademark Office*